(12) United States Patent
Mirashrafi et al.

(10) Patent No.: US 6,212,192 B1
(45) Date of Patent: Apr. 3, 2001

(54) METHOD AND APPARATUS FOR SYNCHRONIZING INFORMATION BROWSING AMONG MULTIPLE SYSTEMS

(75) Inventors: Mojtaba Mirashrafi, Portland; Michael F. Buondonno, Beaverton; John D. Elliott, Portland; Kenneth L. Keeler, Hillsboro, all of OR (US); Keith L. Pirkl, Vancouver, WA (US); Al J. Simon, Hillsboro, OR (US); George L. Taylor, Tigard, OR (US); Mark D. Zuber, Beaverton, OR (US); Paul D. Crutcher, Hillsboro, OR (US)

(73) Assignee: Itxc, Inc., Beaverton, OR (US)

( * ) Notice: Subject to any disclaimer, the term of this patent is extended or adjusted under 35 U.S.C. 154(b) by 0 days.

(21) Appl. No.: 09/121,271

(22) Filed: Jul. 22, 1998

Related U.S. Application Data

(63) Continuation-in-part of application No. 08/818,741, filed on Mar. 14, 1997.

(51) Int. Cl.[7] .................................................. H04L 12/26

(52) U.S. Cl. ........................ 370/401; 370/410; 709/219

(58) Field of Search ..................................... 370/352, 356, 370/400, 401, 410, 522; 709/200, 201, 202, 203, 217, 218, 219, 223, 225, 226, 245, 246, 248, 249, 224

(56) References Cited

U.S. PATENT DOCUMENTS

| | | |
|---|---|---|
| 5,390,169 | 2/1995 | Bernstein . |
| 5,539,884 | 7/1996 | Robrock, II . |
| 5,774,660 * | 6/1998 | Brendel et al. ....................... 709/201 |
| 5,813,007 * | 9/1998 | Nielsen .................................. 707/10 |
| 5,884,032 * | 3/1999 | Bateman et al. ..................... 370/356 |
| 5,978,842 * | 11/1999 | Noble et al. .......................... 709/218 |
| 5,991,810 * | 11/1999 | Shapiro et al. ....................... 709/229 |

FOREIGN PATENT DOCUMENTS 0 581 087 A1    7/1992   (DE) .

OTHER PUBLICATIONS

Patent Cooperation Treaty's International Application Publication Number: WO 96/38018, published Nov. 28, 1996, 26 pgs.

Patent Cooperation Treaty's International Search Report for International application No. PCT/SE 96/00680, dated Sep. 20, 1996, 2 pgs.

"Genesys Telecommunications' net.Vectorin Unites Internet, Advanced Callcenter Capabilities, and Two–Way Realtime Video Conferencing," http://www.genesyslab.com/genesys/press/index.html. Genesys Publications, Dec. 5, 1995.

"Advanced Intelligent Internet," http://www.genesyslab.com/genesys/press/archived/ainn.html, Genesys Publications, Dec. 13, 1995 and Jan. 10, 1996.

"IDT Release Net2Phone Commercial Version Three Months Ahead of Schedule," IDT Press Release, http://www.idt.net/8–5–96.html, pp. 1–3, Aug. 5, 1996.

"SoundXchange interACTIVE," SoundXchange, http://www.iact.com, pp. 1–5, Aug. 9, 1996.

"Internet Telephones," PC Magazine, pp. 107, 108, 110, 114, 117, 118, 119, 120; Oct. 8, 1996.

(List continued on next page.)

Primary Examiner—Huy D. Vu
(74) Attorney, Agent, or Firm—Columbia IP Law Group, LLC

(57) ABSTRACT

In accordance with a method and apparatus for synchronizing information browsing among multiple systems, a bridgeport system receives identifiers for data requests received in a first hardware system and automatically transmits the identifier of the requested data to one or more additional hardware systems. Each of these one or more additional hardware systems then retrieves the identified data, thereby keeping the data being provided in these hardware systems in synchronization.

20 Claims, 6 Drawing Sheets

OTHER PUBLICATIONS

Hill, Jon, "Net2Phone Makes the Call," PC Magazine, p. 58, Oct. 22, 1996.

"IDT Unveils Full–Duplex Version of Net2Phone," IDT Press Release, http://www.idt.net/11–8–96.html, pp. 1–2, Nov. 8, 1996.

"IDT Unveils Net2Phone Direct at COMDEX," IDT Press Release, http://www.idt.net/11–21–96.html, pp. 1–2, Nov. 21, 1996.

Abstract, "SET: Bellcore Specification of Signaling system No. 7 (SS7)," http://www.bellcore.com, p. 1 1996.

Abstract, "Bellcore Specification of Signaling System No. 7 (SS7)," http://www.bellcore.com, pp. 1–2, 1996.

"Atlas Telecom Delivers New Enhanced Services Platform Based on Natural MicroSystems Open Telecommunications Technology," http://www.nmss.com/nmsweb/288a_1f6.html, Nov. 5, 1996.

Telephony Services Architecture: "Natural Platforms" http://www.nmss.com/nmsweb/2486_1e6o.html, 1996.

Natural Platforms: AG–T1 Datasheet "24 Ports of Voice Processing, an Integrated T1 Interface, and Natural Media Options," http://www.nmss.com/nmsweb/22b6_1c6.html, 1996.

"Frequently Asked Questions–Technical Support FAQ's," What is Net2Phone, http://www.net2phone.com/tech-faq.html, pp. 2–8.

Net2Phone Info, http://www.net2phone.com/ninfo.html, p. 1, printed Dec. 17, 1996.

"Welcome to the Vicinty Corporation Home Page," http://www.vicinity.com, pp. 2–3, 1996.

"Microlegend SS7 Tutorial: The SS7 Protocol Stack," http://www.microlegend.com/stack.html, pp. 1–2, last update May 23, 1997.

Microlegend SS7 Tutorial: Signaling Connection Control Part, http://www.microlegend.com/sccp.html, p. 1, last update May 23, 1997.

"Microlegend SS7 Tutorial: Transaction Capabilities Application Part", http://www.microlegend.com/tcap.html, pp. 1–2, lst update May 23, 1997.

"Microlegend SS7 Tutorial: What is SS7?", http://www.microlegend.com/whatss7.html, pp. 1–3 last update May 25, 1997.

"Microlegend SS7 Tutorial: Message Transfer Part", http://www.microlegend.com/mtp.html, pp. 1–5, update Jun. 9, 1997.

"Microlegend SS7 Tutorial: ISDN User Part", http://www.microlegend.com/isup.html, pp. 1–3, last update Jun. 10, 1997.

Telephony Gateway White Paper, "VocalTec Telephony Gateway," http://www.vocaltec.com, pp. 2–9; ©1993–1996.

* cited by examiner

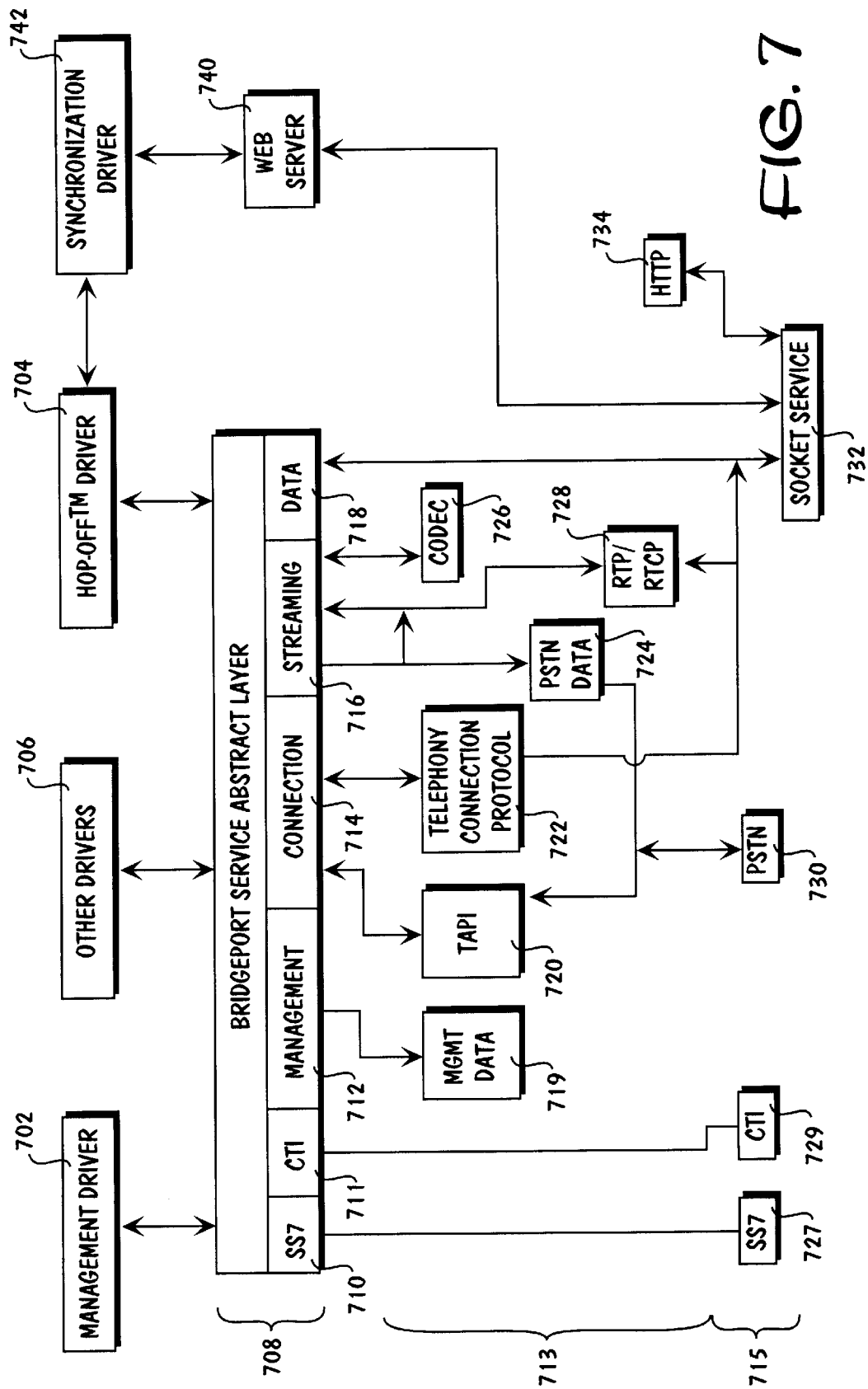

METHOD AND APPARATUS FOR SYNCHRONIZING INFORMATION BROWSING AMONG MULTIPLE SYSTEMS

RELATED APPLICATIONS

This is a continuation-in-part of Application No. 08/818,741, filed Mar. 14, 1997, entitled "Method and Apparatus for Synchronizing Information Browsing Among Multiple Systems".

BACKGROUND OF THE INVENTION

1. Field of the Invention

The present invention relates to the field of telecommunications and, in particular, to a method and apparatus for synchronizing information browsing in a network environment.

2. Background Information

As computer technology has advanced the use of networks has continually increased. A network refers to a system which can couple together two or more computer systems such that the computer systems can communicate with one another. One current network which has recently gained widespread popularity is the Internet, which is a global network allowing individuals throughout the world to communicate with one another.

Communication over the Internet is typically between two computer systems referred to as a client system and a host system. The host system (also referred to as a web server) is the content provider. In other words, content (also referred to as information or data) is provided by the host system to the client system. Host systems often store a large amount of content, with the specific content to be provided to a particular client system being dependent on the request(s) of the client system.

One currently popular use of the Internet is to provide corporate information or content delivery to individual users. Various companies connect host systems to the Internet and make information regarding the company, such as its products and/or services, available to anyone using a client system. Given that many individuals are already accessing host systems to obtain more information about company products and services, it would be beneficial to provide a way to enhance an individual's ability to purchase and/or inquire about products and/or information he or she discovers on the host system. For example, it would be useful to provide a way for a sales agent of a corporation using one computer system to actively assist in the browsing and/or purchasing of products by an individual using a client system to access the corporation's host system.

One problem that can be encountered when using the Internet is that of firewalls. A firewall is used as a shield between an internal network of client computers and an external network such as the Internet. A firewall is typically an additional computer system which allows only certain accesses between the internal network and the external network, based on the programming of the firewall. By limiting external access to the internal network, additional security is provided for the internal network. Thus, it would be beneficial to provide a way to enhance an individual's ability to purchase and/or inquire about products and/or information he or she discovers on a host system without concern for whether the individual or a sales agent is using a system which is located behind a firewall.

As will be described in more detail below, the present invention provides a method and apparatus for synchronizing network browsing among multiple systems which achieves these and other desired results which will be apparent to those skilled in the art from the description that follows.

SUMMARY OF THE INVENTION

A method and apparatus for synchronizing information browsing among multiple systems is described herein. In accordance with the present invention, a bridgeport system receives identifiers for data requests received in a first hardware system and automatically transmits the identifier of the requested data to one or more additional hardware systems. Each of these one or more additional hardware systems then retrieves the identified data, thereby keeping the data being provided in these hardware systems in synchronization.

According to one embodiment of the present invention, either or both of the first hardware system and any of the additional hardware systems can be located behind a firewall.

According to one embodiment, the present invention also facilitates a voice telephone connection to be established between the first hardware system and a telephone set associated with a synchronization partner hardware system while the first hardware system and the additional hardware systems are still enabled to receive requested data synchronously.

BRIEF DESCRIPTION OF THE DRAWINGS

The present invention will be described by way of exemplary embodiments, but not limitations, illustrated in the accompanying drawings in which like references denote similar elements, and in which:

FIG. 7 is a block diagram illustrating the software elements of an exemplary computer server according to one embodiment of the present invention.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as necessarily order dependent in their performance.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
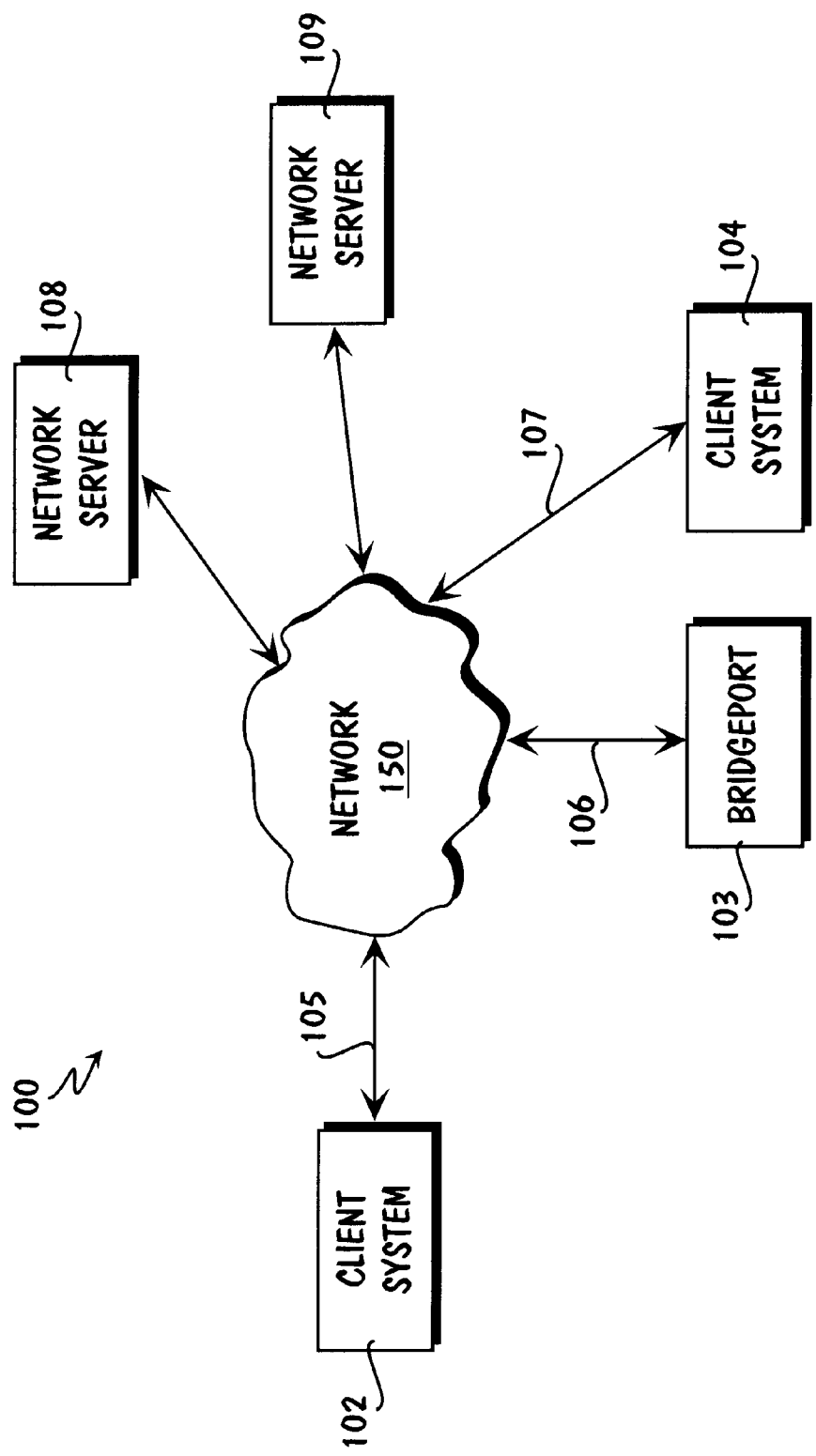
FIG. 1 is a block diagram of a network environment illustrating synchronized information browsing between multiple systems according to one embodiment of the present invention.

FIG. 1 is a block diagram of a network environment illustrating synchronized information browsing between multiple systems according to one embodiment of the present invention. Network environment 100 includes client systems 102 and 104, a network 150, network servers 108 and 109, and a bridgeport 103, coupled together as shown.

Client systems 102 and 104 aided by bridgeport 103 of the present invention are engaged in synchronized browsing of the information available from network servers 108 and 109. Logical connections for exchanging information identifiers are established between each of client systems 102 and 104 and bridgeport 103 using communications links 105, 106, 107, and network 150. These logical connections allow an information identifier to be passed from one of the systems to the other via bridgeport 103 whenever the "current" information identifier changes on one of the systems. As discussed in more detail below, one or more of client systems 102 and 104 may be coupled to network 150 via a firewall.

In the illustrated embodiment, whenever client system 102 initiates access for a new page of information from one of the servers 108 or 109, client system 102 also sends the identifier of the new page to the bridgeport 103, which in turn forwards the identifier to client system 104. Client system 104 in turn accesses the new page as well, thereby keeping the client systems synchronized. Similarly, identifiers for new pages of information accessed by client system 104 are forwarded to client system 102, resulting in client system 102 staying in synchronization with client system 104.

Network 150 can be any of a wide variety of conventional networks, including the Internet or an Intranet. In one embodiment, network 150 supports the HyperText Transmission Protocol (HTTP) and communicates with client systems 102 and 104, network servers 108 and 109, and bridgeport 103 using HTTP connections.

Network servers 108 and 109 store the content being provided to hardware systems such as client systems 102 and 104. In one embodiment, this content is one or more HyperText Markup Language (HTML)-compatible web pages which can be browsed as part of the world wide web, and the information identifiers are uniform resource locators (URLs).

Client systems 102 and 104 are intended to represent a broad range of hardware systems which can be coupled to network 150. In the illustrated embodiment, client systems 102 and 104 execute web browser software complemented with URL monitoring functions. The web browser software allows the user of client systems 102 and 104 to retrieve and view the content stored at network servers 108 and 109. The URL monitoring functions ensure that the web browser software stays in synchronization with each other.

Bridgeport 103 facilitates information identifier exchanges between client system 102 and client system 104 so that systems 102 and 104 are synchronized to provide the same content. In one embodiment, bridgeport 103 maintains a database of current synchronized systems.

It is to be appreciated that additional components can be added to network environment 100, components can be removed from network environment 100, and components of network environment 100 can be combined. By way of example, network environment 100 may include multiple additional client systems or bridgeports coupled to network 150, or only a single network server, or bridgeport 103 could be combined with either a network server or a client system.

Figure 2:
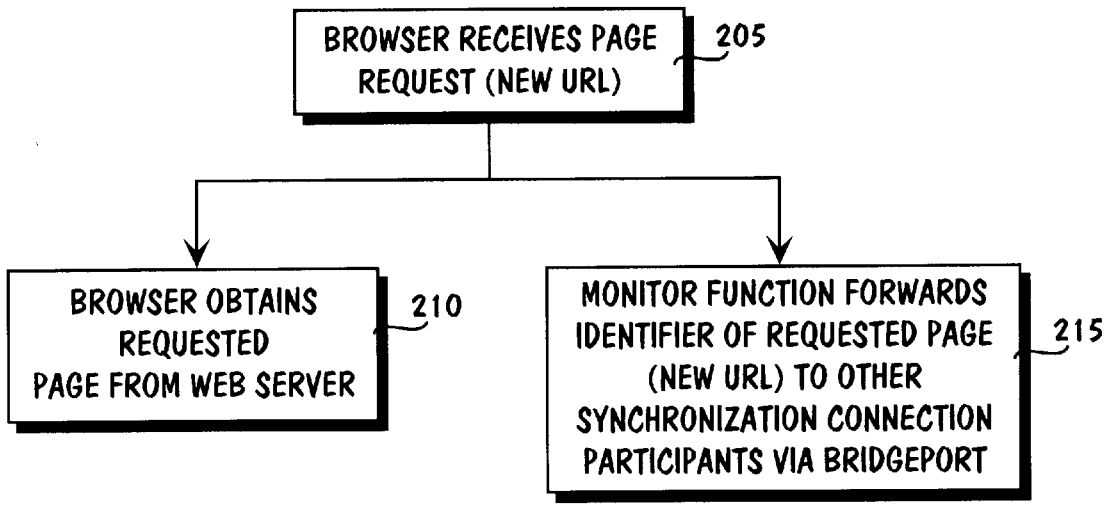
FIG. 2 is a flowchart illustrating the steps for requesting data from a network server according to one embodiment of the present invention.

FIG. 2 is a flowchart illustrating the steps for requesting data from a network server according to one embodiment of the present invention. The browser at the client system receives a new information identifier from the user, step 205. In the illustrated embodiment, this new information identifier is a new URL identifying a new web page. It is to be appreciated that this new information identifier can be input by a user in any of a wide variety of manners, such as direct input (e.g., typing) or selection of a link on a page being viewed by the user (e.g., a hypertext link).

Upon receipt of the information identifier, the browser requests the new page from the identified web server, placing the URL onto network 150, step 210. In due course, the browser receives the requested page in a conventional manner. Simultaneously, the URL monitoring function, detecting the new URL in the browser, forwards the URL of the requested page to the bridgeport, which in turn forwards the URL to the other synchronization participants connected to the same bridgeport, step 215. Thus, whenever the user of the client system requests content from a different page, the URL of that different page is forwarded to the other synchronization participants, thereby allowing each of them to retrieve the page from the web server and synchronizing all participants to the same page. In one embodiment, the browser was launched by the URL monitoring function. Additionally, it is to be appreciated that because each synchronization participant is responsible for retrieving the page from the web server, the page will not be displayed at exactly the same time to all synchronization participants. However, it will be displayed at approximately the same time.

It should be noted that a race condition can occur at the bridgeport by multiple synchronization participants sending URLs to the bridgeport at approximately the same time. The bridgeport forwards URLs received from synchronization participants to the other synchronization participants in the order that the URLs are received. Thus, the race condition is resolved by the last URL received at the bridgeport indicating the content to which the synchronization participants will be synchronized.

It should also be noted that different systems may cache content from web servers differently. This caching may be done, for example, either locally by the hardware system itself or externally by a proxy. Thus, situations may arise where the hardware system retrieves the content from the cache rather than by actually accessing the web server again to retrieve the content.

It should also be noted that the bridgeport can support multiple concurrent synchronization sessions with different participants in each session. In one implementation, the bridgeport maintains a record of each participant in each synchronization session it is handling. Additionally, the bridgeport also maintains a record of which URLs, if any, are waiting to be forwarded to which participants at any given moment.

Figure 3:
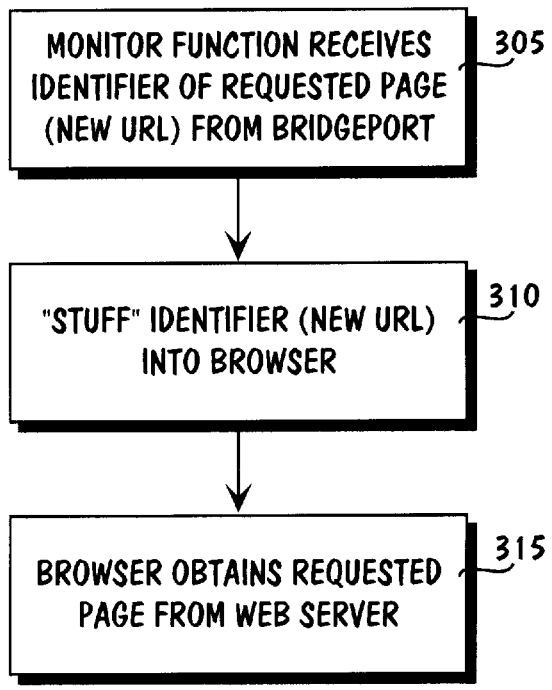
FIG. 3 is a flowchart illustrating the steps followed by a synchronization participant in receiving data in a synchronized manner according to one embodiment of the present invention.

FIG. 3 is a flowchart illustrating the steps followed by a synchronization participant in receiving data in a synchronized manner according to one embodiment of the present invention. The monitor function of a synchronization participant receives an information identifier from the bridgeport, step 305. In the illustrated embodiment, this identifier is a new URL provided to the bridgeport by a synchronization partner in step 215 of FIG. 2. The monitor function "stuffs" the received URL into the browser of the synchronization participant, step 310. The "stuffing" of the URL into the browser is treated by the browser as any other input of a page request by a user. Thus, the browser requests the identified page from the identified web server, placing the "stuffed" URL onto network 150, step 315. In due course, the synchronization participant receives the requested page from the web server, keeping the synchronization participant in synchronization with its partners.

In the discussions above, reference is made to the identifier of a requested page being an URL. However, it is to be appreciated that other identifiers can be used within the spirit and scope of the present invention. In any case, those skilled in the art will appreciate that the above described exchanges of information identifiers imposes a significantly smaller burden on the participants and the bridge as compared to transferring the object data from one participant to another participant. Thus, the present invention achieves synchronization in a much more efficient manner, which makes it possible for the bridgeport to synchronize a large number of participants.

Figure 4:
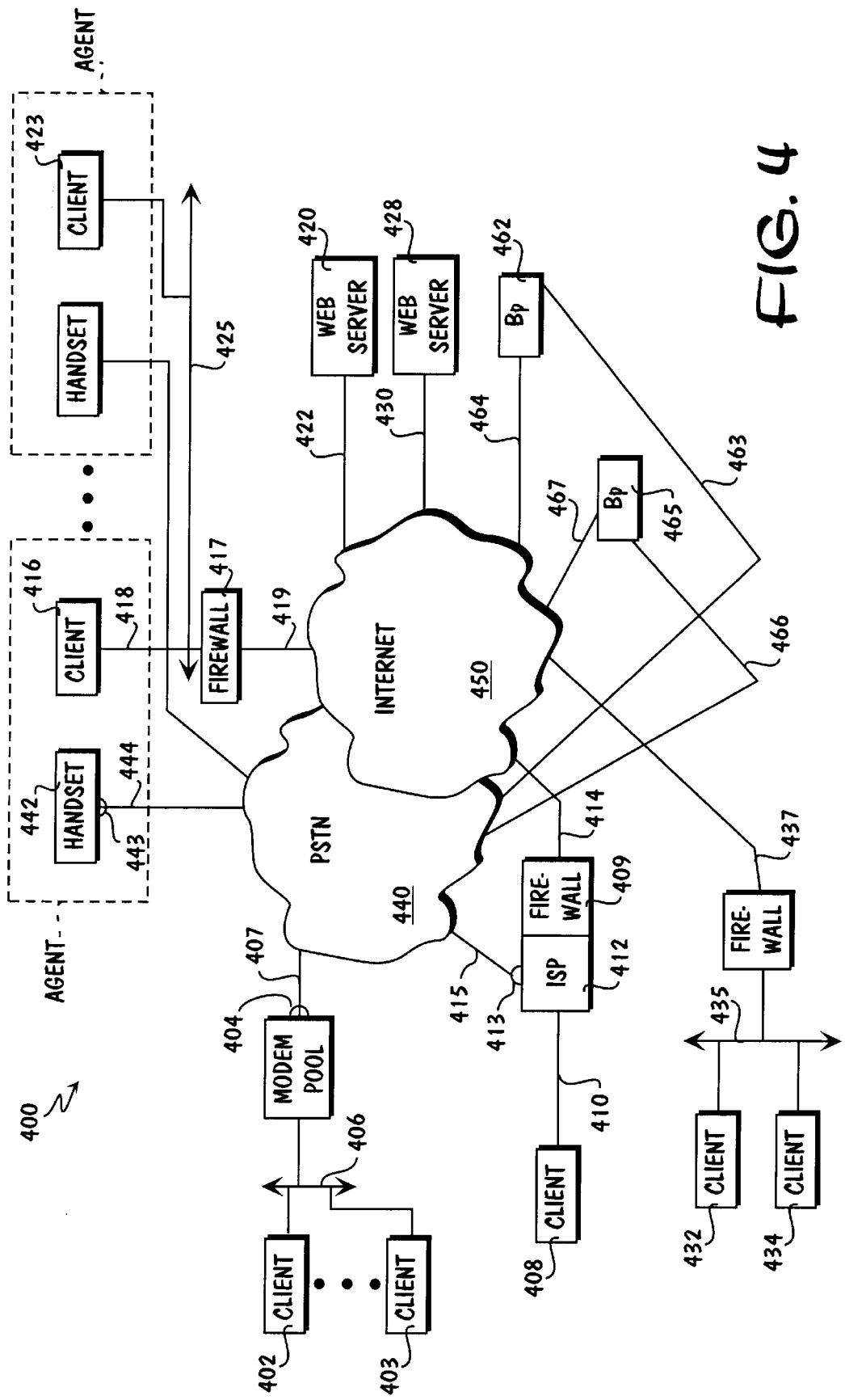
FIG. 4 is a block diagram illustrating an exemplary communication system such as may be used with one embodiment of the present invention.

Referring now to FIG. 4, a block diagram is presented illustrating an exemplary communication system 400 incorporating the teachings of the present invention for synchronizing information browsing among two systems in conjunction with placing a voice call from one of the systems to a telephone handset associated with the other system. While the present invention will be described in the context of this exemplary communication system, based on the descriptions to follow, those skilled in the art will appreciate that the present invention is not limited to this embodiment, and may be also practiced with an Intranet (in lieu of the Internet). In one implementation, client system 402, web server 428, client system 416, and bridgeport 465 of FIG. 4 are client system 102, network server 109, client system 104, and bridgeport 103 of FIG. 1, respectively. Handset 442 is associated with client system 416.

For the illustrated embodiment, client system 402 incorporated with the teachings of the present invention, while in data communication with a web server, e.g. web server 428, through PSTN 440 and Internet 450, is presented with a Push-To-Talk™ option by the web server 428. Push-To-Talk is a trademark of eFusion™, Inc. of Beaverton, Oregon. When client system 402 selects the Push-To-Talk™ option, bridgeport 462 of the present invention automatically determines the PSTN extension of telephone handset 442 as the appropriate destination PSTN extension, as well as an appropriate one of the community of bridgeports 462 and 465 to place the voice call to the PSTN extension and facilitate the voice call between the user of client system 402 and the user of telephone handset 442. The Push-To-Talk™ option is pre-associated with bridgeport 462 by web server 428, and the determination of the destination PSTN extension by bridgeport 462 is made in accordance with one or more attributes of web server 428, such as the identity of web server 428, and optionally, one or more attributes of client system 402, such as the zip code of the area in which client system 402 is located.

Client systems 402 and 403, web servers 420 and 428, bridgeports 462 and 465, and handset 442 are communicatively coupled to each other by way of PSTN 440 and Internet 450 as shown. More specifically, client systems 402 and 403 are coupled to Internet 450 by way of an Internet service provider (ISP) 412. Client systems 402 and 403 are coupled to an internal network 406, such as a local area network (LAN). Client system 402 is coupled to ISP 412 through network 406, modem pool 405, PSTN extension 404, communication line 407, and PSTN 440. Modem pool 405 includes one or more modulation/demodulation (MODEM) devices (not shown) coupled to PSTN extension 404. Client system 403 is similarly coupled to ISP 412 through PSTN 440 and modem pool 405. Additional client systems (not shown) may also be coupled to modem pool 405 and access ISP 412 through modem pool 405. As illustrated, access to Internet 450 via ISP 412 occurs through a firewall 409.

Alternatively, a client system may be coupled to ISP 412 through a network connection using a network interface instead, such as client system 408 using network connection 410. Alternatively, a client system may also be directly coupled to Internet 450 either with or without a firewall.

Additionally, one or more client systems may be directly coupled to Internet 450 via a firewall without use of PSTN 440 or an ISP. For example, client systems 432 and 434 are coupled to a network 435, which is coupled to Internet 450 via firewall 436 and connection 437.

Client system 416 is coupled to Internet 450 through firewall 417, connections 418 and 419, and internal network 425. Additional client systems, such as client system 423, can also be coupled to internal network 425, and thus to Internet 450 through firewall 417.

Client system 416 communicates with bridgeports 462 and 465, as well as other systems coupled to Internet 450, by sending and receiving packets of data over Internet 450 via firewall 417. Each of the data packets includes an identifier of the source and destination of the packet. For data packets sent by client system 416, firewall 417 sends the packets over Internet 450 indicating firewall 417 as the source rather than client system 416, thereby shielding client system 416 from Internet 450. Upon receiving packets of data from Internet 450, firewall 417 provides the packets to the proper client system on network 425.

Web servers 420 and 428 are coupled to Internet 450 through connections 422 and 430. Although not illustrated, web servers 420 and 428 may also be coupled to PSTN 440. Similarly, bridgeports 462 and 465 of the present invention are coupled to Internet 450 through connections 464 and 467. Bridgeports 462 and 465 are also coupled to PSTN 440 through communication lines 463 and 466 respectively. Handset 442 is coupled to PSTN 440 through PSTN extension 443 and communication line 444.

Communication lines 407, 415 and 444 may simply be plain old telephone service (POTS) communication lines, although other types of communication lines may be used. For examples, in the case of communication line 407, it may be an integrated service digital network (ISDN) line, whereas in the case of communication line 415, it may be a Ti (1.533 Mbps) or an El (2.0488 Mbps) trunk line. In the case of communication line 444, it may be a wireless cellular connection. PSTN 440 includes a number of Service Switching Points (SSP), Signal Transfer Points (STP), and Service Control Points (SCP) coupled to each other (not shown). PSTN extension 404 through communication line 406 is coupled to a "local" SSP, which in turn is coupled to a number of other "local" PSTN extensions, including e.g. PSTN extension 413 if ISP 412 is a "local" ISP served by the same SSP. In addition, the "local" SSP is also coupled to an associated STP, which in turn is coupled to other "remote" SSPs. Each of the "remote" SSPs is coupled to a number of "remote" PSTN extensions, including e.g. extension 443, if handset 442 is a "remote" handset served by a "remote" SSP. As is well known in the art, Internet 450 includes a number of networks interconnected by routers, interconnecting the various client computers, web servers and bridgeports together. It is to be appreciated that Internet 450 may be a private Intranet instead.

Except for the incorporated teachings of the present invention for synchronizing information browsing among multiple systems, client systems 402, 403, 408, 432, and 434 are intended to represent a broad category of computer or hardware systems known in the art. An example of such a computer or hardware system is a desktop computer system equipped with a high performance microprocessor, such as the Pentium® processor or Pentium® II processor manufactured by Intel Corporation of Santa Clara, Calif. or the Alpha® processor manufactured by Digital Equipment Corporation of Manard, Mass.; a communication interface for sending and receiving various data packets (including audio data packets) in accordance with certain standard communication protocol, such as a V.42bis compliant modem or an Ethernet adapter card; a windows-based operating system including internetworking communication services providing support for Transmission Control Protocol/Internet Protocol (TCP/IP) (and other Internet Communication Suite protocols) and socket services, such as Windows™, 95 developed by Microsoft Corporation of Redmond, Wash.; and a web communications tool such as Navigator™, developed by Netscape Communications of Mountain View, Calif. Another example of such a computer or hardware system is an Internet "appliance" device, such as a WebTV™ Internet Terminal available from Sony Electronics Inc. of Park Ridge, N.J., or Philips Consumer Electronics Company of Knoxville, Tenn.

In the illustrated embodiment, client systems 402, 403, 408, 432, and 434 are also equipped with a number of audio input and output peripherals/interfaces for inputting, digitizing and compressing outbound audio, and for decompressing and rendering inbound audio, and an Internet telephony application, such as IPhone[1] developed by Intel Corporation. However, it is to be appreciated that alternate embodiments need not be so equipped.

Note that it is not necessary for the Internet telepony application to explicitly support voice calls with PSTN handsets, as is the case with IPhone and many of the prior art internet telephony applications.

In one embodiment, the teachings of the present invention which are the responsibility of the client system are incorporated in client systems 402, 403, 408, 432, and 434 in the form of a client bridgeport driver. The client bridgeport driver may be made available to client systems 402, 403, 408, 432, and 434 in a wide variety of manners. For example, the client bridgeport driver may be distributed via diskettes produced by a bridgeport vendor, or downloaded from a web server of the bridgeport vendor. In other embodiments, the teachings of the present invention are incorporated in the browser and/or the operating system of client systems 402, 403, 408, 432, and 434. For ease of understanding, the remaining descriptions will be presented in the context of the client bridgeport driver embodiment.

Except for the presentation of web pages having Push-To-Talk™ options preassociated with the bridgeports of the present invention, web servers 420 and 428 are intended to represent a broad category of web servers, including e.g. corporate presence servers and government presence servers, known in the art. Any number of high performance computer servers may be employed as web servers 420 and 428, e.g. a computer server equipped with one or more Pentium® Pro processors from Intel Corp., running Microsoft's Windows® NT operating system, or a computer server equipped with one or more SPARC® processors from Sun Microsystems of Mountain View, Calif., running Sun's Solaris® operating system.

Similarly, ISP 412 is intended to represent a broad category of Internet service providers. An ISP may be a "small" local Internet access provider, or one of a number of point of presence providers offered by a "large" ISP. It is also anticipated that ISP 412 may be incorporated with an SSP of PSTN 440. Handset 442 is intended to represent a broad category of conventional handsets known in the art, including but not limited to desktop handsets, cordless handsets, and wireless handsets. No special features are required of handset 442 for it to be called and connected to Internet telephony enabled client system 402, in accordance with the present invention. As described earlier, handset 442 may also be automated/computerized telephony answering equipment.

Before we proceed to describe bridgeports 462 and 465 in further detail, it should be noted that one skilled in the art of, e.g., telecommunications, will appreciate that the communication system illustrated in FIG. 4, is significantly more complex than what is depicted. For example, each SSP of PSTN 440 may service thousands of PSTN extensions, and there are numerous SSPs, STPs and SCPs in a common PSTN implementation. Internet 450 includes well over several hundred thousands of networks. Together, PSTN 440 and Internet 450 interconnects millions of client computers and web servers. Nonetheless, FIG. 4 does capture a number of the more relevant components of a communication system necessary to illustrate the interrelationship between client system 402, web server 428, bridgeports 462 and 465, and handset 442, such that one skilled in the art may practice the present invention. Also, while the present invention is being described in the context of client system 432 being engaged in data communication with web server 428, as will be readily apparent from the description to follow, the present invention may be practiced with any "client" computer engaged in data communication with any "web" or "information" server.

Figure 5:
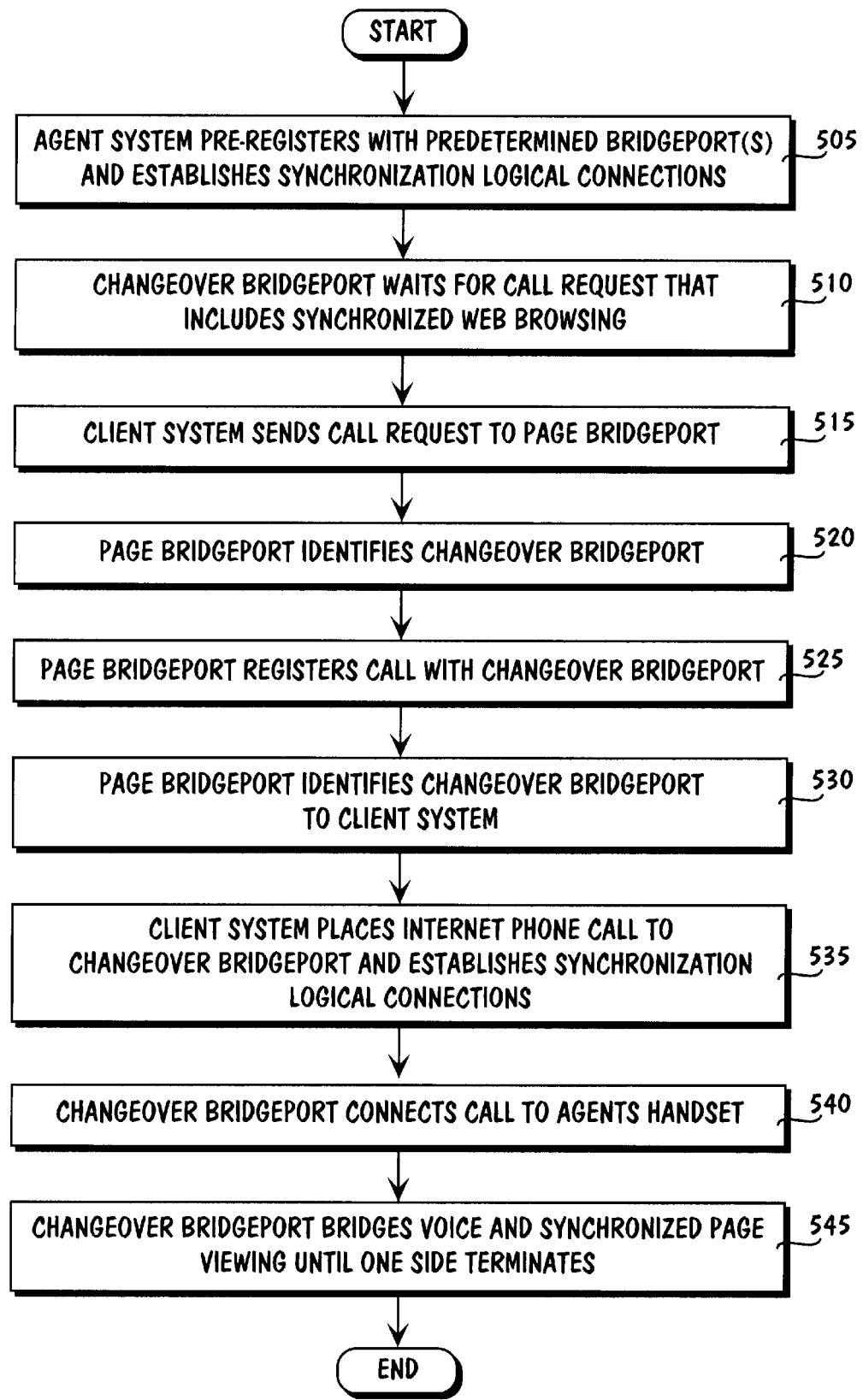
FIG. 5 is a flowchart illustrating the steps followed in establishing synchronized browsing according to one embodiment of the present invention.

FIG. 5 is a flowchart illustrating the steps followed in establishing synchronized browsing according to one embodiment of the present invention. Initially, client system 416 acting as an agent system pre-registers itself with predetermined ones of the community of bridgeport(s) and establishes synchronization logical connections, step 505. The pre-registration registers the agent system to become a synchronization partner to a client system who places a voice call to the agent system's associated telephone handset. This pre-registration occurs whenever the user of the agent system is ready to be a synchronization partner. The predetermined bridgeports could be any set of known bridgeports, such as the bridgeports owned by the corporation the agent works for.

As part of the pre-registration process, client system 416 provides its internal network address to the predetermined bridgeport(s) as well as an identifier of handset 442 (e.g., an extension number). This internal network address could be an IP address or alternatively another type of address, depending on the protocol of the internal network 425 behind firewall 417. Thus, each of the predetermined bridgeport(s) knows the address of the initiator of the packets on Internet 450, which is firewall 417, as well as the address of the true source of the packets, which is client system 416.

The bridgeport then waits for a request to place a voice call to the associated handset, step 510. At some point in time after the agent system has pre-registered, the bridgeport driver of a client system sends a voice call to the page bridgeport, step 515. The voice call request processing includes the synchronization with the agent system associated with the selected telephone handset. This voice call/synchronization request can be initiated in any of a wide variety of manners. In one embodiment, the voice call/synchronization request is initiated as a result of the selection of a Push-To-Talk™ option present by the web server as described earlier. In the illustrated embodiment, the selection of a Push-To-Talk™ option results in a Push-To-Talk™ event being posted to a page bridgeport. The page bridgeport is the bridgeport to which the Push-To-Talk™ option is pre-associated. In response, the page bridgeport identifies itself to the client system and launches the client bridgeport driver. In one embodiment, in addition to initiating the voice call/synchronization request, the client bridgeport driver further launches a new browser instance to monitor its URLs.

In the illustrated embodiment, where client system 432 is coupled to Internet 450 through firewall 436, the client bridgeport driver communicates with the page bridgeport, as well as the changeover bridgeport discussed below, using HTTP. Using HTTP rather than other protocols allows client system 432 to traverse firewall 436 when accessing Internet 450. Firewall 436 passes HTTP data packets through without interfering with them. However, it should be noted that, from the point of view of other systems coupled to Internet 450, the source of packets from client system 432 is actually firewall 436.

Additionally, as part of the voice call/synchronization request, the client bridgeport driver provides the internal address of client system 432 on network 435 to the page bridgeport. This allows the page and/or changeover bridgeport to uniquely identify client system 432 behind firewall 436, as discussed in more detail below.

Upon receiving the voice call/synchronization request, the page bridgeport selects a bridgeport that will be used to place the voice call and facilitate the synchronization, step 520. The selected bridgeport is referred to as the changeover bridgeport. In one embodiment, this identification process involves soliciting information from various potential changeover bridgeports and determining which to use based on the solicited information. A discussion of automatic placement and facilitation of a telephone call to a PSTN extension from a networked client computer is disclosed in copending U.S. patent application Ser. No. 08/818,770, filed Mar. 14, 1997, entitled, "Method and Apparatus for Establishing a Voice Call to a PSTN Extension for a Networked Client Computer", which is hereby fully incorporated by reference.

Once the page bridgeport identifies the changeover bridgeport that will be used, the page bridgeport registers the voice call/synchronization request with the changeover bridgeport, step 525. This registration identifies to the changeover bridgeport that it will be handling a voice call as well as facilitating synchronized browsing and allows the changeover bridgeport to reserve resources for the call and the synchronization. As part of the registration process, the changeover bridgeport returns an indication to the page bridgeport that the voice call/synchronized browsing has been successfully registered with the changeover bridgeport.

The page bridgeport then identifies the changeover bridgeport to the client system, step 530. This information includes the Internet address of the changeover bridgeport, thereby allowing the client bridgeport driver to place a packet based phone call from the client system to the changeover bridgeport as well as establishing the above described synchronization connection between the client system and the changeover bridgeport, step 535.

The changeover bridgeport then places a PSTN phone call to the agent's handset via the PSTN and bridges the two calls, as well as bridges the synchronization participants for synchronization browsing, step 540. Upon receiving the PSTN phone call the agent provides an identifier (e.g., by entering an extension number on the keypad of the agent's handset) which corresponds to the identifier provided to the predetermined bridgeports by the agent during pre-registration. Entry of such an identifier allows the changeover bridgeport to identify the address of client system 416 based on the preregistration information.

The changeover bridgeport compares the address of the initiator of the pre-registration packets on the Internet to the address of the source of the packets to determine whether they match. If the two addresses are the same, then the initiator of the packets on the Internet is the same as the source of the packets, and thus the agent system is not located behind a firewall. However, if the two addresses are not the same, then the initiator of the packets on the Internet is not the same as the source of the packets, and thus the agent system might be located behind a firewall.

The changeover bridgeport maintains a record of both the address of the initiator of the packets on the Internet as well as the address of the source of the packets. This record allows the changeover bridgeport to uniquely identify particular agent systems as synchronization participants, regardless of whether they are located behind a firewall.

Accordinag to on e implementation, the changeover bridgeport combines the two addresses together, such as by concatenating the two, and uses the combined address as the address to u niquely identify the agent system wit hin the changeover bridgeport. By way of example, this unique identifier could be stored in the format of "x;y", where "x" is the address of the initiator of the data packets on the Internet and "y" is the address of the source of the cet packets.

Similarly, the changeover bridgeport compares the address of the initiator of the voice call/synchronization request on the Internet to the address of the source of the packets (previously provided as the internal address of client system 432 on network 435). Analogous to the discussion above regarding the agent system, if the two addresses are the same then the initiator of the packets on the Internet is the same as the source of the packets, and thus the client system is not located behind a firewall. However, if the two addresses are not the same, then the initiator of the packet on the Internet is not the same as the source of the packets, and thus the client system might be located behind a firewall. According to one embodiment, the changeover bridgeport maintains a record of both the initiator of the packets on the Internet and the address of the source of the packets using the "x;y" format discussed above.

Thus, a voice connection between the client system and the associated handset as well as synchronized browsing between the client system and the agent system are established.

In the illustrated embodiment, where HTTP connections are employed, the connections are maintained by periodically (e.g., every minute) sending "keep alive" messages to each of the systems involved in the synchronization. This allows each client system to keep its connection to the changeover bridgeport active.

The synchronization among the client system, the agent system, and the changeover bridgeport continues until either the client or the agent system terminates, step 545. The call can be terminated in any of a wide variety of manners, such as by one side hanging up the phone. A termination at one side causes the present invention at that side to send a "terminate" message to the changeover bridgeport.

In alternate embodiments, firewall 436 could include or operate in conjunction with an Internet phone proxy used to manage packet based phone calls between client systems on an internal network and the Internet. During setup of the Internet phone connection with the changeover bridgeport the Internet phone application provides its internal address to the changeover bridgeport as well as the address of firewall 436. The changeover bridgeport uses the "x;y" format, analogous to the discussion above regarding the agent system, to uniquely identify the client system executing the Internet phone application. However, if an Internet phone proxy is in use, then the changeover bridgeport will receive packets from the phone proxy, has a different address on the Internet than firewall 436. In such situations, the changeover bridgeport simply ignores the address of the phone proxy and continues to use "x;y" information provided by the Internet phone application during setup to uniquely identify the client system executing the Internet phone application.

It should be noted that although the client system establishes a voice connection as well as synchronized browsing with a changeover bridgeport, the client system is still able to establish other HTTP connections to the Internet for browsing. Thus, the client system is able to browse various web servers as well as communicate with the changeover bridgeport.

It should also be noted that although the agent system is described as preregistering with one or more predetermined changeover bridgeport(s), in alternate embodiments, rather than pre-registering, the agent system may register with the changeover bridgeport after the voice call is received from the changeover bridgeport.

In summary, when used in conjunction with automatic placement of a voice call from a client system to a telephone handset associated with an agent system, the present invention allows a user of a client system to jointly browse web pages with an agent and at the same time be talking to the agent without having to provide or even have knowledge of the address of the agent system or the phone number of the agent's telephone handset. Furthermore, according to one embodiment, this joint web page browsing and telephone connection occurs without concern on the part of the user for whether the user system or agent system is located behind a firewall.

It is to be appreciated, however, that the synchronized browsing of the present invention can occur without an accompanying voice call. It will be understood by those skilled in the art that steps analogous to those discussed above with reference to FIG. 5 can be performed without the voice call to provide a synchronized browsing session. For example, client systems 402 and 408 of FIG. 4 could be engaged in a synchronized browsing session without an accompanying voice call.

Figure 6:
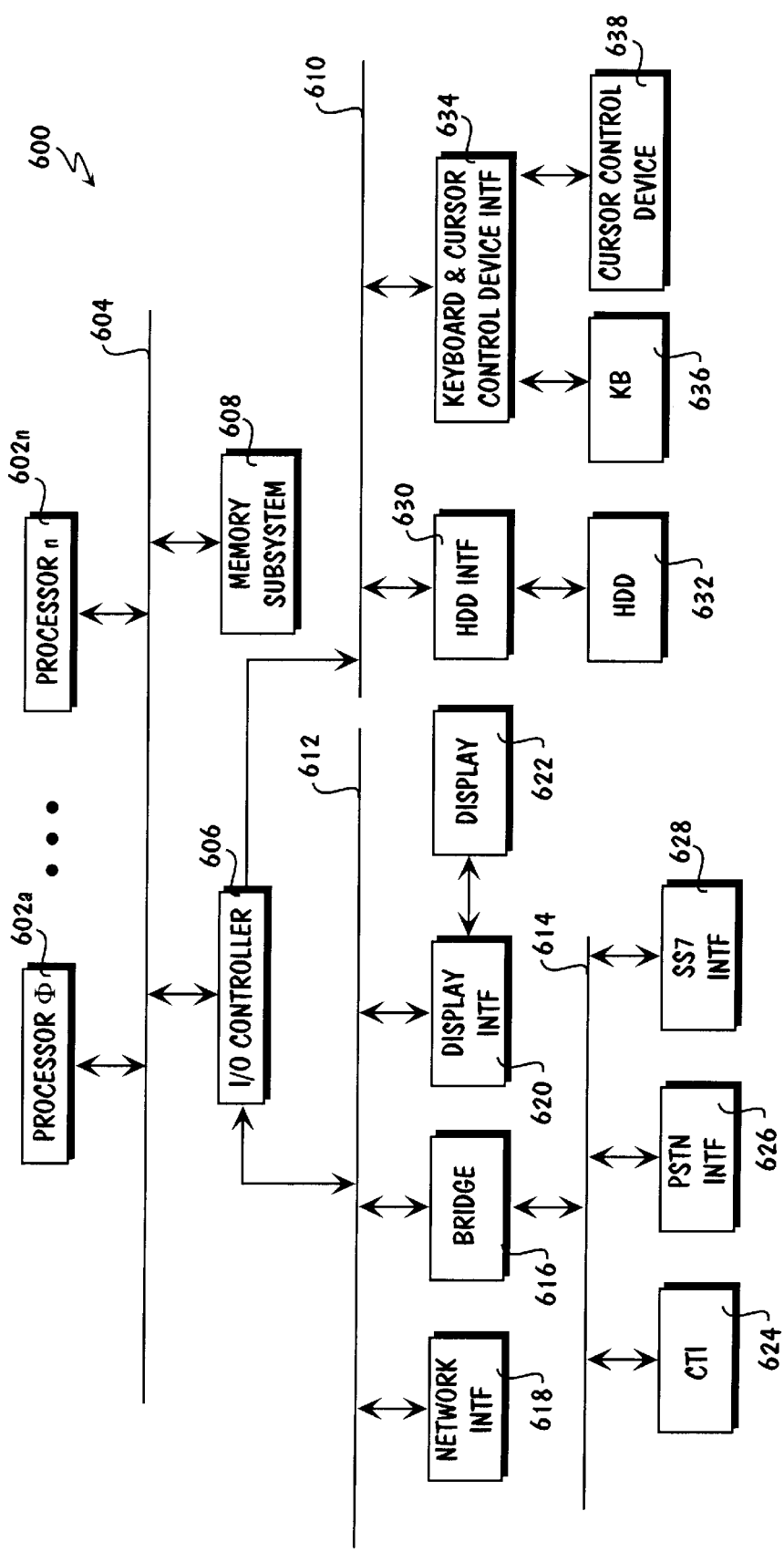
FIG. 6 is a block diagram illustrating the hardware elements of an exemplary computer server according to one embodiment of the present invention.

Turning now to FIGS. 6 and 7, two block diagrams illustrating the hardware and software elements of an exemplary computer server 600 suitable to be employed as a bridgeport are depicted. As illustrated, exemplary computer server 600 is comprised of multiple processors 602a–602n and memory subsystem 608 coupled to processor bus 604 as depicted. Additionally, computer server 600 is comprised of a second bus 610, a third bus 612 and a fourth bus 614. In one embodiment, buses 612 and 614 are Peripheral Component Interconnect (PCI) buses, while bus 610 is an Industry Standard Architecture (ISA) bus. PCI buses 612 and 614 are bridged by bus bridge 616, and bridged to ISA bus 610 and processor bus 604 by I/O controller 606. Coupled to PCI bus 612 are network interface 618 and display interface 620, which in turn is coupled to display 622. Coupled to PCI bus 614 is computer telephony interface (CTI) 624, PSTN interface 626 and SS7 Interface 628. Coupled to ISA bus 610 are hard disk interface 630, which in turn is coupled to a hard drive 632. Additionally, coupled to ISA bus 610. keyboard and cursor control device 634, which in turn is coupled keyboard 636 and cursor control device 638.

CTI interface 624 provides the necessary hardware to interface exemplary computer server 600 to telephony equipment, such as private branch exchange (PBX) equipment. PSTN interface 626 provides the necessary hardware to interface exemplary computer server 600 to a plurality of PSTN communication lines (e.g., T1, E1 or POTS), wherein the actual number of PSTN communication lines interfaced will be implementation dependent. Additionally, PSTN interface 626 provides advanced DSP-based voice, dual-tone multiple frequency (DTMF) and call progress functionality, which allows for downloadable DSP protocol and voice processing algorithms, thereby providing CODEC support locally on the interface. Examples of supported codecs include the Global System for Mobile Communications (GSM) codec and the ITU-T G.723.1 protocol codecs, the specification for which are commonly available from the GSM consortium and the International Telecommunications Union, respectively. Similarly, SS7 interface 628 provides the hardware necessary to interface exemplary computer server 600 with PSTN trunk lines (e.g., ISDN) supporting the out-of-band communication protocol (e.g., SS7)) used between PSTN network elements (i.e., SSP-SSP, SSP-STP, STP-SCP, etc.). In one embodiment, PSTN interface 626 is preferably an AG-T1™ (for U.S. implementations, while an AG-El may be seamlessly substituted for European implementations), while SS7 interface 628 is preferably the TX3000™, both of which, along with their accompanying software drivers, are manufactured by and commonly available from Natural MicroSystems of Natick, Mass. Otherwise, all other elements, processors 602a–602n, memory system 608 and so forth perform their conventional functions known in the art. Insofar as their constitutions are generally well known to those skilled in the art, they need not be further described.

From a software perspective, FIG. 7 illustrates the software elements of exemplary computer server 600. In particular, exemplary computer server 600 is shown comprising an application layer consisting of a Bridgeport Management Driver 702, Hop-Off™ driver 704, and other drivers 706. Hop-Off™ is a trademark of eFusion™, Inc. of Beaverton, Oregon. Hop-Off™ driver 704, supported by Management Driver 702, optional drivers 706, abstracted service layer 708, and synchronization driver 742 implement the method steps of FIGS. 2, 3 and 5 that are the responsibility of the community of bridgeports (i.e., bridgeports 462 and 465 of FIG. 4).

The Service Abstraction Layer (SAL) 708 is shown comprising SS7 services 710, CTI Services 711, Management Services 712, Connection Services 714, Streaming Services 716, and Data Services 718. The protocol/service layer 713 is shown comprising Telephony Application Programming Interface (TAPI) 720, Telephony Connection Protocol 722, PSTN Data Interface 724, CODEC services 726, Real Time (Streaming) Protocol 728, and HTTP server 734. Also shown in this "layer" is configuration management data 719 maintained by management service 712. The driver layer 715 is shown comprising SS7 driver 727, CTI driver 729, PSTN driver 730 and socket service 732 (e.g., WinSock 2). Data and control information are exchanged between these elements in the fashion depicted.

Within the context of the present invention, one purpose of SAL 708 is to provide an Application Programming Interface (API) for all the available bridgeport and related services in exemplary computer server 600. The API abstracts out the actual modules used for providing services such as connection establishment (714), streaming and data exchange services (716 and 718). Additionally, SAL 708 provides the common operation tools such as queue management, statistics management, state management and the necessary interface between the plug-in services (i.e., drivers in the driver layer). SAL 708 is also responsible for loading and unloading the appropriate drivers as appropriate.

Connection service 714 includes a connection establishment and tear-down mechanism facilitating the interconnection to the PSTN 440 of FIG. 4. Additionally, for the illustrated embodiment, connection service 714 employs connection and compatibility services which facilitate interoperation between communication equipment that support industry standards, thereby allowing a variety of communication equipment manufactured by different vendors to be benefited from the present invention. Connection services 714 can include, for example, services for supporting standard video telephony (e.g., ITU-T's H.323 video telephony) and services for supporting standard data communication (e.g., ITU-T's T.120 data communication protocol). Examples of the connection establishment and tear-down mechanisms supported by connection service layer 714 include opening and starting PSTN ports, call control, DTMF collection, and tone generation, to name but a few.

Streaming service 716 is responsible for interfacing with the components that provide the real-time streaming functionality for the multimedia data. Once the connection has been established between the connection points (i.e., PSTN, H.323, etc.), streaming service 716 will take over the management and streaming of data between the two connected parties, until the connection is terminated.

Data service 718 is responsible for providing non real-time peer to peer (i.e., computer-computer) messaging and data exchange between exemplary computer server 600 and other Internet and perhaps PSTN based applications. Sending messages to exemplary computer server end-points (i.e., other similarly equipped bridgeports on the Internet) or other servers within the PSTN is accomplished via data service 718.

CTI services 711 service all communications and automatic call distribution (ACD) necessary for Private Branch Exchange (PBX) based systems. SS7 services 710 service all out of band communications with STPs and/or SCPs of PSTN 440.

PSTN driver 730 is equipped to accommodate particularized PSTN interfaces 626, whereas CTI driver 729 is equipped to support particularized ACD and PBX equipment. Similarly, SS7 driver 727 is equipped to support particularized SS7 interface 628.

Web server 740 is equipped to provide web service with the Internet. In one embodiment, web server 740 is a web server developed by Microsoft Corporation of Redmond, Wash. In the illustrated embodiment, synchronization driver 742 implements the synchronized information browsing at the bridgeport. Synchronization driver 742 maintains a record of which client systems are participants in which synchronization sessions. When a particular client system sends a new identifier to the bridgeport, the client system identifies itself as well as the URL which is to be synchronized. Synchronization driver 742 identifies which synchronization session the client system is a participant in, and forwards the passed URL to all the participants of that session.

In one embodiment, the portions of the method and apparatus for synchronizing information browsing among multiple systems discussed above which are implemented at the host bridgeport are implemented as a series of software routines which are synchronization driver 742 of FIG. 7. These software routines comprise a plurality or series of instructions to be executed by a processor(s) in a hardware system, such as processors 602a–602n of FIG. 6. Initially, the series of instructions are stored on a storage device, such as mass storage device 622. The instructions are copied from storage device 622 into memory subsystem 608 and then accessed and executed by one or more processor(s) 602a–602n. In one implementation, these software routines are written in the C++ programming language. It is to be appreciated, however, that these routines may be implemented in any of a wide variety of programming languages. In alternate embodiments, the present invention is implemented in discrete hardware or firmware. For example, an application specific integrated circuit (ASIC) could be programmed with the above described functions of the present invention.

In several of the discussions above, the network environment is described as including the Internet. It is to be appreciated, however, that the present invention can be used with any type of network environment and is not limited to being used with the Internet. By way of example, the present invention could also be used within a local area network (LAN) or an Intranet.

In the discussions above, reference is made to placing a packet based phone call from the client system to a bridgeport, which in turn is converted into a PSTN voice call to a handset at the agent system. In alternate embodiments, the PSTN voice call can be placed to an Internet telephony application executing on the agent systems instead.

It should be noted that although the discussions above describe the transmitting of identifiers such as URLs between multiple systems, the present invention can be used to transfer any type of information identifier between multiple systems.

It should also be noted that although the discussions above describe the synchronized connection of two systems, any number of systems can be synchronized using the present invention. For example, the agent system could "conference" in additional synchronization participants in any of a wide variety of manners. By way of another example, a client system could "conference" in additional participants in any of a wide variety of manners, such as by selecting additional Push-To-Talk™ options provided by the web server, such as "talk to sales representative", "talk to financing specialist", "talk to technical support" , "talk to customer service", etc., any combination of which can be selected by the user. The synchronized connection of any additional participants is performed in the same manner as discussed above.

It is to be appreciated that any hardware system equipped with the client aspect of the present invention can initiate the synchronized connection between two or more hardware systems.

It is also to be appreciated that although some of the above discussions describe both synchronized browsing with information identifiers and a voice connection between systems, synchronized browsing does not require a voice connection.

Thus, the present invention provides a method and apparatus for synchronizing information browsing among multiple systems. An identifier of information requested by a particular hardware system is advantageously forwarded to other hardware systems which are part of a synchronization partnership, thereby allowing each agent in the synchronization partnership to obtain the requested information from its source. Additionally, in one embodiment, a voice telephone connection is advantageously established between the users of the hardware systems in the synchronization partnership, thereby advantageously allowing voice communication while the users are jointly browsing the pages and servers of the network.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. In a bride server, a method of synchronizing a plurality of hardware systems coupled to the bridge server in a network environment, the method comprising:

(a) receiving by said bridge server, an identifier of data requested of an information server, from a first hardware system of the plurality of hardware systems, via a first coupling independent of said information server; and (b) transmitting by said bridge server, the identifier to a second hardware system of the plurality of hardware systems via a second coupling in order to enable the second hardware system to synchronously retrieve the requested data from the information server.

2. The method of claim 1, wherein the first coupling includes a firewall protecting said first hardware system.

3. The method of claim 1, wherein the second coupling includes a firewall protecting said second hardware system.

4. The method of claim 1, wherein said receiving comprises receiving by said bridge server, a world wide web page Uniform Resource Locator (URL), from the first hardware system, via said first coupling independent of said information server, the URL identifying the requested data as being located on said information server.

5. The method of claim 1, wherein the network environment includes the Internet.

6. The method of claim 1, further comprising the bridge server facilitating establishing a voice telephone connection between the first hardware system and the second hardware system while the first hardware system and the second hardware system are still enabled to synchronously receive requested data from said information server.

7. The method of claim 1, further comprising the bridge server maintaining a registration database which identifies each hardware system in a synchronized data request connection.

8. The method of claim 1, further comprising the bride server transmitting the independently received identifier to one or more additional hardware systems of the plurality of hardware systems in order to enable each of the one or more additional hardware systems to synchronously retrieve the requested data from the information server.

9. A bridging apparatus comprising:

an interface to provide communication with a network; and control logic, coupled to the interface, operative to receive an identifier of data requested of an information server, from a first hardware system of a plurality of hardware systems via a first coupling independent of the information server, the control logic also operative to transmit the identifier to a second hardware system of the plurality of hardware systems via a second coupling to enable the second hardware system to synchronously retrieve the requested data from the information server.

10. The apparatus of claim 9, wherein the first coupling includes a firewall protecting the first hardware system.

11. The apparatus of claim 9, wherein the second coupling includes a firewall protecting the second hardware system.

12. The apparatus of claim 9, wherein the network includes the Internet.

13. The apparatus of claim 9, further comprising a driver to facilitate establishing and maintaining a voice telephone connection between the first hardware system and the second hardware system while the first hardware system and the second hardware system are still enabled to synchronously receive requested data from the information server.

14. The apparatus of claim 9, wherein the control logic is further operative to transmit the identifier to one or more additional hardware systems of the plurality of hardware systems in order to enable each of the one or more additional hardware systems to synchronously retrieve the requested data from the information server.

15. A computer-readable medium having stored thereon a plurality of instructions for synchronizing a plurality of hardware systems in a network environment, the plurality of instructions designed to be executed by a processor of a bridge server and to implement a function on the bridge seerver to:

receive an identifier of data requested of an information server, from a first hardware system of the plurality of hardware systems via a first coupling independent of the information server; and transmit the identifier to a second hardware system of the plurality of hardware systems via a second coupling in order to enable the second hardware system to synchronously retrieve the requested data from the information server.

16. The computer-readable medium of claim 15, wherein the first coupling includes a firewall protecting the first hardware system.

17. The computer-readable medium of claim 15, wherein the second coupling includes a firewall protecting the second hardware system.

18. The computer-readable medium of claim 15, wherein the plurality of instructions are further designed to implement a function on the bridge server to facilitate establishing a voice telephone connection between the first hardware system and the second hardware system while the first hardware system and the second hardware system are still enabled to synchronously receive requested data from the information server.

19. The computer-readable medium of claim 15, wherein the plurality of instructions are further designed to implement a function to maintain on the bridge server, a registration database which identifies each hardware system in a synchronized data request connection.

20. The computer-readable medium of claim 15, wherein the plurality of instructions are further designed to implement a function on the bridge server to transmit the received identifier (independent of the information server) to one or more additional hardware systems of the plurality of hardware systems in order to enable each of the one or more additional hardware systems to synchronously retrieve the requested data from the information server.

* * * * *

UNITED STATES PATENT AND TRADEMARK OFFICE
CERTIFICATE OF CORRECTION

PATENT NO.    : 6,212,192 B1                                          Page 1 of 1
DATED         : April 3, 2001
INVENTOR(S)   : Mojtaba Mirashrafi et al.

It is certified that error appears in the above-identified patent and that said Letters Patent is hereby corrected as shown below:

Column 15,
Line 49, correct "bride" to read -- bridge --.

Signed and Sealed this

Twenty-second Day of April, 2003

JAMES E. ROGAN
*Director of the United States Patent and Trademark Office*